No. 671,220. Patented Apr. 2, 1901.
B. T. LETTS.
BLOW-OFF COCK FOR BOILERS.
(Application filed June 22, 1900.)
(No Model.)
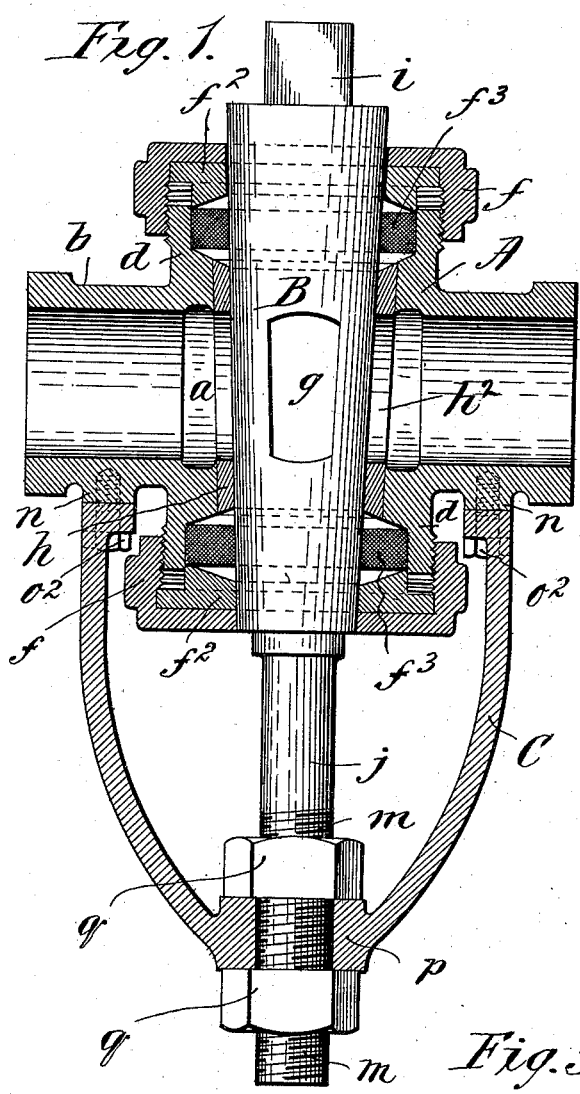
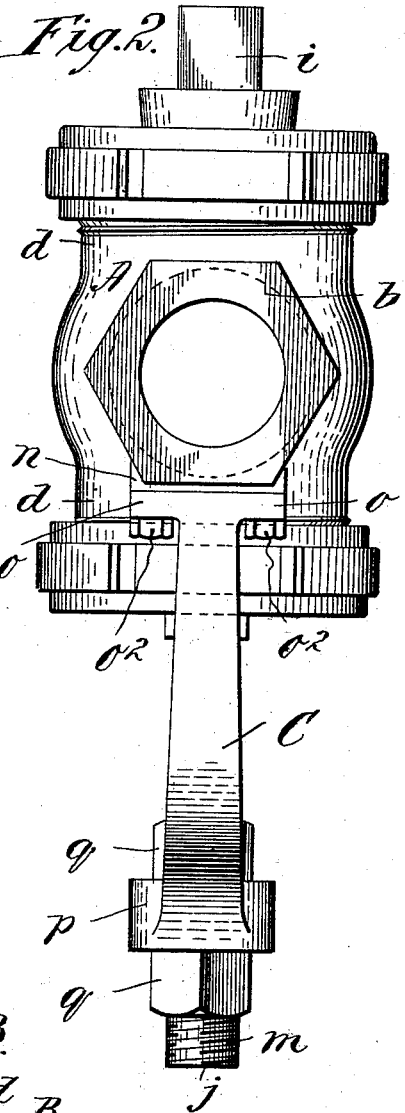
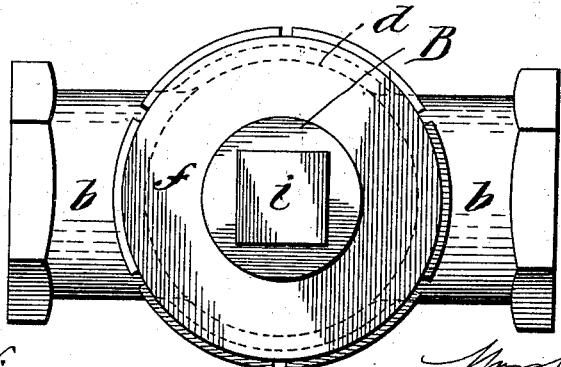
Witnesses
Geo. E. Frech.
E. M. Knight.
Inventor
Benj. T. Letts
By
Attorney

UNITED STATES PATENT OFFICE.

BENJAMIN T. LETTS, OF ELIZABETH, NEW JERSEY.

BLOW-OFF COCK FOR BOILERS.

SPECIFICATION forming part of Letters Patent No. 671,220, dated April 2, 1901.

Application filed June 22, 1900. Serial No. 21,196. (No model.)

*To all whom it may concern:*

Be it known that I, BENJAMIN T. LETTS, a citizen of the United States of America, and a resident of Elizabeth, in the county of Union and State of New Jersey, have invented certain new and useful Improvements in Blow-Off Cocks for Boilers, of which the following is a full, clear, and exact description.

This invention relates to improved blow-off cocks or valves for steam-boilers.

In blow-off cocks of the ordinary kind now in general use when the plug or valve becomes worn or loose in its tapered seat the only means whereby it may be set tight for a time is by hammering at the end of the plug to crowd it into a closer bearing. This causes the body of the valve to spread and to become untrue, so that if a new plug is finally provided it finds an untrue and imperfect seat.

The principal object of the present invention is to provide such improved constructions and appliances in and in conjunction with the blow-off that the tapered plug-valve comprised therein may have the capability for slight endwise adjustment within its tapered seat and that the said plug-valve may be positively held and restrained in any of its given adjustments.

Another object of the invention is to so construct the blow-off cock that the valve or its seat, or both, may be readily replaced without the necessity of renewal of the body or without even a disconnection of the body from the boiler; and to these ends the invention consists in the constructions and combinations of parts, all substantially as hereinafter fully described, and explained and set forth in the claim.

The improved blow-off cock is illustrated in the accompanying drawings, in which—

Figure 1 is a central sectional view through the blow-off cock. Fig. 2 is a side view of the cock as seen in a position at right angles to Fig. 1. Fig. 3 is a plan view of Fig. 1.

Similar letters represent corresponding parts in all of the views.

In the drawings, A represents the body of the blow-off cock or valve, having the central opening $a$ and the oppositely-extended hollow hubs $b\,b$, constituting connection members, one for connection by a suitable coupling-pipe section with the boiler and the other with the discharge-pipe, or itself constituting the discharge-passage for the blow-off. The said body is also provided with the hollow hubs $d\,d$, which are in axial line with each other at right angles to the axial line of the aforementioned hubs $b\,b$, the same being constructed at their ends with external screw-threads for the connection therewith of the packing-glands $f\,f$, inside of which are the followers $f^2\,f^2$ and the compressible packings $f^3\,f^3$. The wall within the inner portions of the said hubs $d\,d$ and adjacent the center of the valve-body is constructed tapered, receiving therein the tapered bushing $h$, having the transverse aperture $h^2$ therethrough in the line of the axis of the hubs $b\,b$.

B represents the plug or valve proper of the blow-off, the same being tapered to fit in the said tapered bushing and having the crossway or opening $g$ therethrough, which may have its position across the line of the passage through the hubs $b\,b$ or at right angles thereto, as shown in Fig. 1. The ends of the valve-plug are extended beyond the opening $g$ sufficiently far to have their positions adjacent and to be encircled by the packing-boxes, and one end of the valve-plug is constructed with the squared part $i$ by means of which to conveniently turn the valve, while at its other end the same has the extended stem or spindle $j$, the extremity of which is screw-threaded, as indicated at $m$, said stem being integrally formed with the valve-plug or as a permanent portion thereof.

The body of the cock is externally constructed or cast with the rests or square-faced shoulders $n$, upon which the feet or flanges $o$ of the yoke C are abutted and secured by the bolts $o^2$. The said yoke comprises distant from the body of the blow-off cock the centrally-apertured abutment portion $p$, through which the said threaded portion of the stem of the plug-valve protrudes loosely. $q\,q$ represent nuts screw-threading on the stem of the plug-valve and arranged and adapted to be set up or seated against the said abutment portion $p$ of the yoke C. Now if in use it is found that the valve-plug does not fit sufficiently tight in the tapered seat within the valve-body therefor the inner nut may be loosened away from the abutment p by being screwed toward the valve-body, and then by turning up the nut outside of the abutment the valve may be drawn axially and to a closer seating.

Of course it will be understood that if the valve-plug is required to be comparatively loose within its seat, so as to be easily turned, a reversal of the adjusting operations just above described may be practiced, and the nuts in addition to serving as means for effecting the adjustments also serve as retainers, securely holding the valve when properly set against endwise vibration or movement.

It will be apparent that the valve-plug may be easily removed to be ground or substituted by a new one, the replacement or substitution being also as readily performed.

By the provision of a blow-off constructed as described no necessity arises for pounding the plug into its seat, and the seat, as also the valve, remains intact and unimpaired for an indefinite time.

Having thus described my invention, what I claim, and desire to secure by Letters Patent, is—

In a blow-off for boilers, in combination, the body A having therein a tapered seat and externally provided with the integrally-cast rests or shoulders $n\,n$, the tapered valve-plug having the crossway $g$ fitted in said seat and having an axial stem projected to the exterior of the body and provided at its extremity with a screw-thread, the yoke C the opposite members of which are provided with the flanges or feet, bolted to said portions $n\,n$ of the body, while the central outer and uniting portion $p$ of the yoke is apertured for the passage loosely therethrough of the threaded stem, and the nuts $q\,q$ screwing on the stem and adapted to be set up against opposite sides of the said portion $p$ of the yoke, all as shown.

Signed by me in presence of two subscribing witnesses.

BENJAMIN T. LETTS.

Witnesses:
W. S. BELLOWS,
E. M. KNIGHT.